US012764653B2

(12) United States Patent
Liu et al.

(10) Patent No.: US 12,764,653 B2
(45) Date of Patent: Oct. 13, 2026

(54) METHOD PERFORMED BY SIDELINK REMOTE USER EQUIPMENT, AND USER EQUIPMENT

(71) Applicant: SHARP KABUSHIKI KAISHA, Sakai City (JP)

(72) Inventors: Lei Liu, Shanghai (CN); Renmao Liu, Shanghai (CN); Ningjuan Chang, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 195 days.

(21) Appl. No.: 18/288,013

(22) PCT Filed: Apr. 26, 2022

(86) PCT No.: PCT/CN2022/089211

§ 371 (c)(1),
(2) Date: Oct. 23, 2023

(87) PCT Pub. No.: WO2022/228419

PCT Pub. Date: Nov. 3, 2022

(65) Prior Publication Data

US 2024/0224172 A1 Jul. 4, 2024

(30) Foreign Application Priority Data

Apr. 30, 2021 (CN) ......................... 202110487566.1

(51) Int. Cl.
*H04W 48/16* (2009.01)
*H04W 48/20* (2009.01)
*H04W 76/20* (2018.01)

(52) U.S. Cl.
CPC ........... *H04W 48/20* (2013.01); *H04W 48/16* (2013.01); *H04W 76/20* (2018.02)

(58) Field of Classification Search
None
See application file for complete search history.

(56) References Cited

U.S. PATENT DOCUMENTS

2021/0160953 A1 5/2021 Mildh et al.
2024/0056951 A1* 2/2024 Back ..................... H04W 40/22

FOREIGN PATENT DOCUMENTS

CN 111989982 A 11/2020
CN 114342483 A 4/2022
WO 2020/091684 A1 5/2020

OTHER PUBLICATIONS

"3GPP, '5G; NR; Radio Resource Control (RRC); Protocol Specification', 3GPP TS 38.331 V16.4.1, Apr. 16, 2021" (Year: 2021).*
(Continued)

*Primary Examiner* — Jenkey Van
(74) *Attorney, Agent, or Firm* — ScienBiziP, P.C.

(57) ABSTRACT

The present invention provides a method performed by sidelink remote user equipment (UE) and user equipment. The method comprises: receiving, by the sidelink remote UE out of coverage, a discovery message transmitted by sidelink relay UE, and saving a first cell identifier carried in the discovery message as a current cell identifier; receiving a system message forwarded by the sidelink relay UE; initiating RRC connection establishment, performing an access control procedure, and starting a first timer when access is barred; and during the running of the first timer, in case a first condition is met, then stopping the first timer, and performing barring alleviation.

2 Claims, 7 Drawing Sheets

(56) References Cited

OTHER PUBLICATIONS

Sharp, "Discussion on access control of L2 relay", R2-2110284, 3GPP TSG-RAN WG2 Meeting #116 electronic, Online, Nov. 1-12, 2021.
Qualcomm Incorporated, "Remaining issues on RRC connection management of L2 U2N relay", R2-2109427, 3GPP TSG RAN WG2 Meeting #116-e, E-Conference, Nov. 1-12, 2021.
Vivo, "RRC Connection Management for L2 relay", R2-2103325, 3GPP TSG-RAN WG2 Meeting #113-bis electronic, E-Meeting, Apr. 12-Apr. 20, 2021.
Vodafone, "New SID: Study on NR V2X", RP-181429 (RP-181480 is the revised version of RP-181429), 3GPP TSG RAN Meeting #80, La Jolla, USA, Jun. 11-14, 2018.
OPPO, "New SID: Study on NR sidelink relay", RP-193253, (revision of RP-193118), 3GPP TSG RAN Meeting #86, Sitges, Spain, Dec. 9-12, 2019.
OPPO, "Revised SID: Study on NR sidelink relay", RP-201474, (revision of RP-193253), 3GPP TSG RAN Meeting #89e, Electronic Meeting, Sep. 14-Sep. 18, 2020.
Ericsson (Moderator) et al., "New WID on NR Sidelink Relay", RP-210904, 3GPP TSG RAN Meeting #91e, Electronic Meeting, Mar. 16-26, 2021.

* cited by examiner (a) Scenario 1: Remote UE is out of coverage (b) Scenario 2: Remote UE is in coverage (c) Scenario 3: Remote UE and relay UE are in different cells

METHOD PERFORMED BY SIDELINK REMOTE USER EQUIPMENT, AND USER EQUIPMENT

TECHNICAL FIELD

The present invention relates to the technical field of wireless communications. More specifically, the present invention relates to a method for sidelink relay selection or reselection performed by user equipment, and corresponding user equipment.

BACKGROUND

At the 3rd Generation Partnership Project (3GPP) RAN #80 plenary meeting in June 2018, the subject of the study on the feasibility of V2X based on 5G NR network technology of Release 16 (see non-patent literature: RP-181480, New SID Proposal: Study on NR V2X) was approved. The primary function included in NR V2X of Release 16 is to support unicast, multicast, and broadcast in out-of-coverage and in-coverage scenarios.

At the RAN #86 plenary meeting in December 2019, a study item on NR sidelink relaying of Release 17 was proposed (see non-patent literature: RP-193253, New Study Item on NR Sidelink Relaying), and was approved. Regarding the latest release of the study item, see non-patent literature: RP-201474, Revised SID: NR Sidelink Relay. The study item mainly studies the solution to user equipment (UE)-to-network and UE-to-UE relaying, so as to extend sidelink-based coverage. One of the goals of the foregoing research project is to support the selection and reselection of sidelink relays.

At the RAN #91 plenary meeting in March 2020, a study item on NR sidelink relaying of Release 17 was proposed (see non-patent literature: RP-210904, New Study Item on NR Sidelink Relaying), and was approved. One of the goals of the foregoing work item is to standardize the selection and reselection of sidelink relays.

Remote UE, in order to perform sidelink communication with a base station or another piece of remote UE, may need to select relay UE to provide a relay service for the remote UE. When the remote UE selects relay UE to serve itself, the remote UE may perform relay reselection due to various conditions.

The present invention discusses the handling of the remote UE in selection and reselection scenarios.

SUMMARY

In order to solve at least some of the above problems, the present invention provides a method performed by sidelink remote user equipment and user equipment, which are capable of promptly initiating an access attempt to a network during selection or reselection of sidelink relay UE, reducing latency, and ensuring service quality.

According to the present invention, provided is a method performed by sidelink remote UE, comprising: receiving, by the sidelink remote UE out of coverage, a discovery message transmitted by sidelink relay UE, and saving a first cell identifier carried in the discovery message as a current cell identifier; receiving a system message forwarded by the sidelink relay UE; initiating RRC connection establishment, performing an access control procedure, and starting a first timer when access is barred; and during the running of the first timer, in case a first condition is met, then stopping the first timer, and performing barring alleviation.

Optionally, the first cell identifier comprises at least one of the following forms: a physical cell identifier; a cell global identifier; and an NR cell identifier.

Optionally, the first condition comprises at least one of the following: selection or reselection of the sidelink relay UE occurs; and a cell identifier of the selected or reselected sidelink relay UE is different from a cell identifier of the current cell.

Optionally, the first timer comprises at least one of the following: T390; and a timer used to control the sidelink remote UE to perform access control.

Optionally, in case the sidelink relay UE does not carry the cell identifier in the discovery message, during the running of the first timer, in case the selection or reselection of the sidelink relay UE occurs, then stopping the first timer, and performing the barring alleviation.

According to the present invention, provided is another method performed by sidelink remote UE, comprising: initiating, by the sidelink remote UE in an RRC_IDLE state, RRC connection establishment, and starting a T300 or T302 timer; and during the running of T300 or T302, in case a first condition is met, then performing, by the sidelink remote UE, actions upon going to RRC_IDLE, and notifying an upper layer of an RRC connection release cause.

According to the present invention, further provided is a method performed by sidelink remote UE, comprising: initiating, by the sidelink remote UE in an RRC_INACTIVE state, RRC connection resume, and starting a T319 or T302 timer; and during the running of T319 or T302, in case a first condition is met, then performing, by the sidelink remote UE, actions upon going to RRC_IDLE, and notifying an upper layer of an RRC connection release cause.

According to the present invention, further provided is a method performed by sidelink remote UE, comprising: initiating, by the sidelink remote UE in an RRC_CONNECTED state, RRC connection re-establishment, and starting a T311 timer; and during the running of T311, in case a first condition is met, then stopping, by the sidelink remote UE, T311.

DETAILED DESCRIPTION

Figure 1:
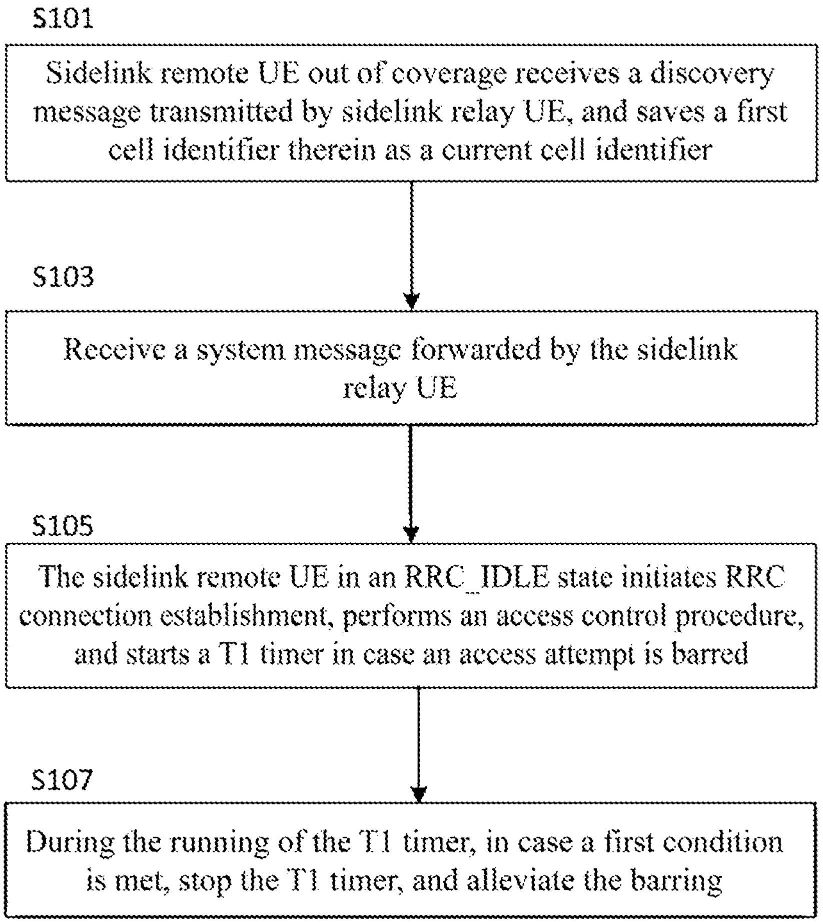
FIG. 1 is a flowchart of a method performed by sidelink remote user equipment according to Embodiment 1 of the present invention.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

The following describes some terms involved in the present invention. For the specific meanings of the terms, please see the latest 3GPP standards and specifications, such as TS38.300, TS38.331, TS36.300, TS36.331, etc. The terms involved in the present invention shall have the meanings set forth below, unless otherwise indicated.

UE: User Equipment
NR: New Radio
RRC: Radio Resource Control
RRC_CONNECTED: RRC connected state
RRC_INACTIVE: RRC inactive state
RRC_IDLE: RRC idle state
RAN: Radio Access Network
Sidelink: Sidelink communication
SCI: Sidelink Control Information
AS: Access Stratum
IE: Information Element
CE: Control Element
MIB: Master Information Block
NR: New Radio
SIB: System Information Block
NG-RAN: NG Radio Access Network
PLMN: Public Land Mobile Network
PCI: Physical Cell Identifier
CGI: Cell Global Identifier
NCI: NR Cell Identity
MAC: Medium Access Control
DCI: Downlink Control Information In the present invention, a network, a base station, and a RAN may be used interchangeably. The network may be a Long Term Evolution (LTE) network, a new RAT (NR) network, an enhanced Long Term Evolution (eLTE) network, or another network defined in a subsequent evolved version of the 3GPP.

In the present invention, user equipment (UE) may refer to an NR device that supports an NR sidelink relaying function as described in the background, or an NR device or an LTE device of another type.

Hereinafter, a description will be given of related art of the present invention.

An NCGI is used to identify an NR cell globally. The NCGI is composed of a PLMN ID and an NCI. The NCI is indicated by an information element CellIdentity in a system message.

In NR, when UE finds that an access category thereof is barred according to system information broadcast by a network, the UE calculates the time of access barring according to information in the system information, starts a T390 timer, and does not initiate access to the network again during the running of the timer. After the UE transmits an RRCSetupRequest message, the UE starts a T300 timer. When the UE receives an RRCReject message when initiating RRC connection establishment or resume, the UE starts a T302 timer according to a waitTime information element in the message. When the UE initiates an RRC connection re-establishment procedure, the UE starts a T311 timer. When the UE transmits an RRCResumeRequest or RRCResumeRequest1 message, the UE starts a T319 timer.

A PC5 interface is an interface for performing control plane and user plane sidelink communication between UE and UE. For sidelink unicast, a PC5-RRC connection is an AS layer logical connection between a pair of a source layer-2 ID and a target layer-2 ID. Setup of one PC5 unicast link corresponds to setup of one PC5-RRC connection.

Figure 8:
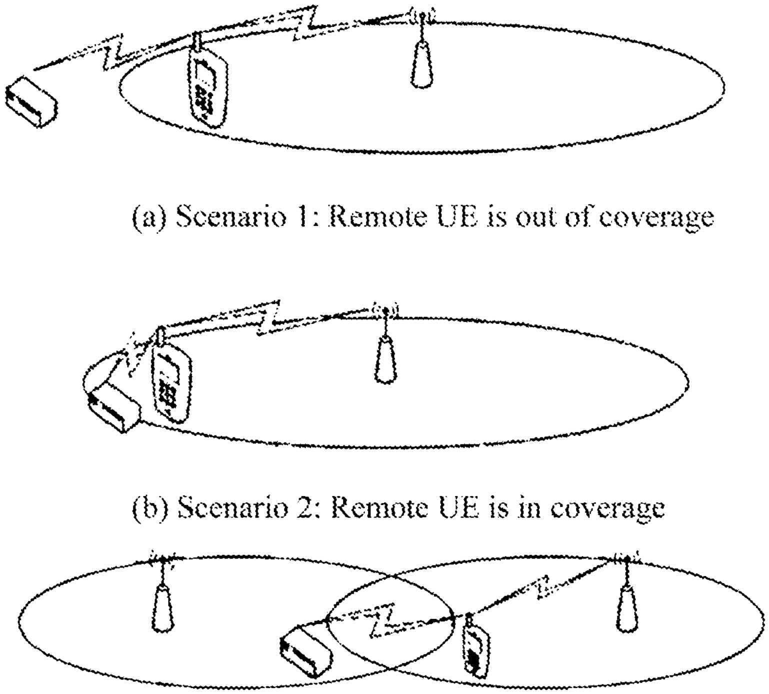
FIG. 8 is a schematic diagram showing scenarios 1 to 3 of UE-to-network relay.

FIG. 8 is a schematic diagram showing scenarios 1 to 3 of UE-to-network relay, in which (a) in FIG. 8 shows scenario 1 in which remote UE is out of coverage, (b) in FIG. 8 shows scenario 2 in which the remote UE is in coverage, and (c) in FIG. 8 shows scenario 3 in which the remote UE and relay UE are in different cells. As shown in FIG. 8, in scenario 1 and scenario 2, the left side is the remote UE, the middle is the relay UE, and the right side is the network; in scenario 3, both sides are the network, and the middle, from left to right, is the remote UE and the relay UE, respectively. The remote UE and the relay UE are connected to each other by means of a PC5 interface, and the relay UE is connected to the network by means of a Uu interface. Because the remote UE is far from the network or because the communication environment is poor, the relay UE is needed to relay and forward signaling and data between the remote UE and the network.

UE-to-network relay scenarios include:

1) the remote UE is out of coverage, and the relay UE is in coverage;
2) the remote UE and the relay UE are both in coverage, and are in the same cell; and
3) the remote UE and the relay UE are both in coverage, but are in different cells.

Figure 9:
FIG. 9 is a schematic diagram showing UE-to-UE relay.

FIG. 9 is a schematic diagram showing UE-to-UE relay. As shown in FIG. 9, the left and right sides are the remote UE, and the middle is the relay UE. The remote UE are each connected to the relay UE by means of a PC5 interface. Because the two pieces of remote UE are far from each other or because a communication environment is poor, the relay UE is needed to relay and forward signaling and data therebetween.

UE-to-UE relay scenarios include:

1) in coverage: the two pieces of remote UE (i.e., the source-side UE and the target-side UE) and the relay UE are all in coverage;
2) out of coverage: the two pieces of remote UE (i.e., the source-side UE and the target-side UE) and the relay UE are all out of coverage; and
3) partial coverage: among the two pieces of remote UE and the relay UE, at least one piece of UE is in coverage, and at least one piece of UE is out of coverage.

After the remote UE selects one piece of relay UE to provide a relay service for the remote UE, the remote UE will establish a PC5-RRC connection to the relay UE, so as to communicate with the network by means of the relay UE. For a sidelink layer two-relay architecture, the remote UE can establish an air interface RRC connection to the network by means of the relay UE for data transmission between the remote UE and the network. The remote UE encapsulates messages such as RRC connection establishment, re-establishment, and resume to the network in a PC5 message and transmit the PC5 message to the relay UE, and the relay UE forwards the PC5 message to the network after receiving the PC5 message. Conversely, an RRC message replied by the network is encapsulated in a PC5 message by the relay UE and forwarded to the remote UE. When the remote UE initiates a procedure such as RRC connection establishment, re-establishment, or resume to the network, the remote UE can perform an access control check.

The remote UE can acquire system information of a cell by means of the relay UE. The relay UE can carry cell information in a discovery message. After the remote UE and the relay UE establish a PC5 connection, relay selection or reselection can be triggered according to various reasons such as a PC5 link measurement result, or an upper layer instruction, or a relay UE instruction. In this case, in case the remote UE happens to be in the running period of T390, in case a cell of the reselected relay UE is different from the cell of the previously connected relay UE, in case the remote UE is still restricted by T390, the remote UE will not be able to promptly initiate access to the network, affecting service quality.

By means of the present invention, when the sidelink remote UE selects or reselects the sidelink relay UE, the sidelink remote UE can promptly initiate access to the network, reducing latency and ensuring service quality.

Hereinafter, several embodiments of the present invention for addressing the above problems are described in detail.

Embodiment 1

FIG. 1 is a flowchart of a method performed by sidelink remote user equipment according to Embodiment 1 of the present invention.

The present embodiment includes steps 101, 103, 105, and 107.

Optionally, in step 101, the sidelink remote UE receives a discovery message transmitted by sidelink relay UE, and saves a first cell identifier carried in the message. Optionally, the sidelink remote UE uses the first cell identifier as a current cell identifier.

The "cell" in the first cell identifier may be a cell which the sidelink relay UE camps on or a serving cell of the sidelink relay UE. The first cell identifier may be in one of the following forms: a PCI, a CGI, and an NCI (i.e., CellIdentity).

Optionally, in step 103, the sidelink remote UE receives a system message (SIB).

Optionally, the received system message is directly broadcast by a network; or optionally, the received system message is forwarded by the sidelink relay UE, and the sidelink relay UE can forward the system message by means of broadcast, multicast, or unicast.

Optionally, in step 105, the sidelink remote UE in an RRC_IDLE state initiates an RRC connection establishment procedure with the network, and performs a unified access control procedure. In the access control procedure, an access barring check is performed according to the system message acquired in step 101. In case an access attempt is barred, a timer T1 is started, and the procedure ends (that is, an RRC connection establishment request message is not transmitted to the network). The T1 timer may be for each access category.

Optionally, in step 107, during the running of T1 or in case T1 is running, in case a first condition is met, the sidelink remote UE stops T1 and performs barring alleviation.

The first condition includes one or more of the following:

1) in case sidelink relay UE selection or reselection occurs (optionally, in case suitable/candidate sidelink relay UE is selected or reselected); and
2) in case a second cell identifier of the selected or reselected sidelink relay UE is different from the first cell identifier (or different from the current cell identifier).

In case the sidelink relay UE does not carry the first cell identifier in the discovery message in step 101, then a first variant of the first condition is: in case sidelink relay UE selection or reselection occurs (optionally, in case suitable/candidate sidelink relay UE is selected or reselected).

In case the selected or reselected sidelink relay UE does not carry a cell identifier, then a second variant of the first condition includes one or more of the following:

1) in case sidelink relay UE selection or reselection occurs (optionally, in case suitable/candidate sidelink relay UE is selected or reselected); and
2) in case the selected or reselected sidelink relay UE does not carry a cell identifier in the discovery message.

Optionally, the sidelink remote UE stops T1 for all access categories. Optionally, in case the sidelink remote UE is in an out-of-coverage scenario, step 107 is performed; otherwise, step 107 is not performed.

T1 may be a T390 timer, or a timer used to control the sidelink remote UE to perform access control (the function thereof is the same as the function of T390, but a value range thereof may be different). T1 in the following embodiments all conform to the description herein, and details will not be repeated.

The triggering of relay selection or reselection by the remote UE includes, but is not limited to, the following scenarios (the scenarios of triggering relay UE selection or reselection in the following embodiments are the same as the scenarios herein, and details will not be repeated):

1) detecting that PC5-RRC link quality is lower than a certain threshold;
2) detecting that the quality of the discovery message transmitted by the relay UE is lower than a certain threshold;
3) receiving a trigger instruction from an upper layer;
4) receiving a trigger instruction from the relay UE, which may be included in a PC5-RRC message or in a PC5-S message; and
5) receiving a trigger instruction from the network, which may be included in an RRC message, or in a MAC CE, or in physical layer DCI.

Embodiment 2

Figure 2:
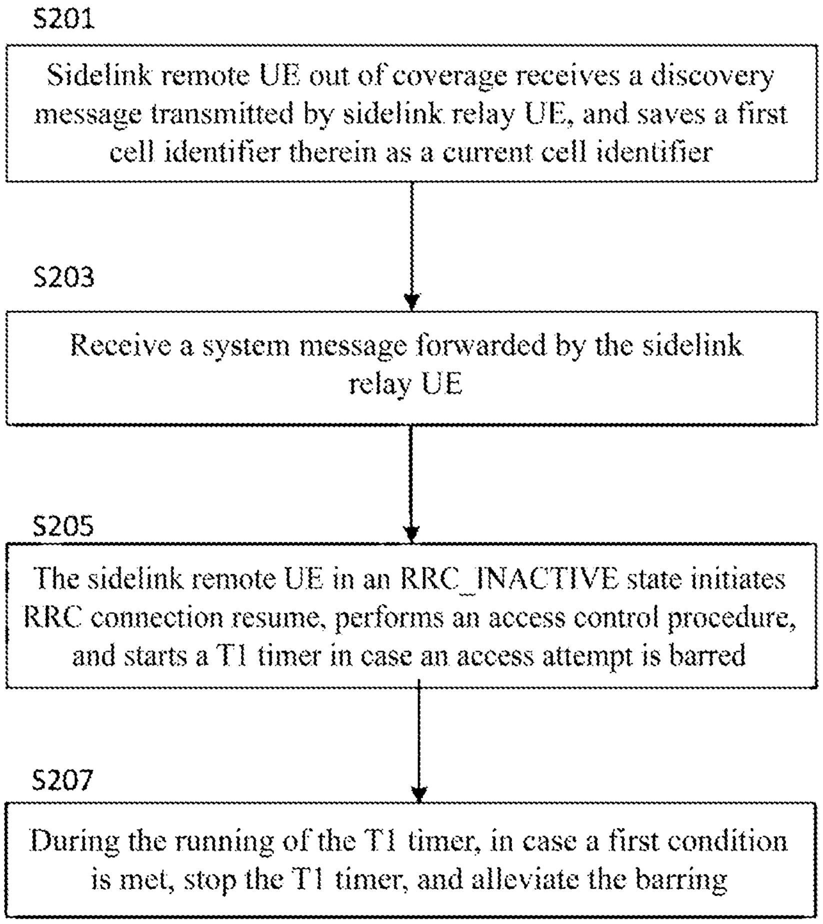
FIG. 2 is a flowchart of a method performed by sidelink remote user equipment according to Embodiment 2 of the present invention.

FIG. 2 is a flowchart of a method performed by sidelink remote user equipment according to Embodiment 2 of the present invention.

The present embodiment includes steps 201, 203, 205, and 207.

Optionally, step 201 is the same as step 101, and step 203 is the same as step 103.

Optionally, in step 205, the sidelink remote UE in an RRC_INACTIVE state initiates an RRC connection resume procedure with a network, and performs a unified access control procedure. In the access control procedure, an access barring check is performed according to a system message acquired in step 203. In case an access attempt is barred, a timer T1 is started, and the procedure ends (that is, an RRC connection resume request message is not transmitted to the network). The T1 timer may be for each access category.

Step 207 is the same as step 107.

Embodiment 3

Figure 3:
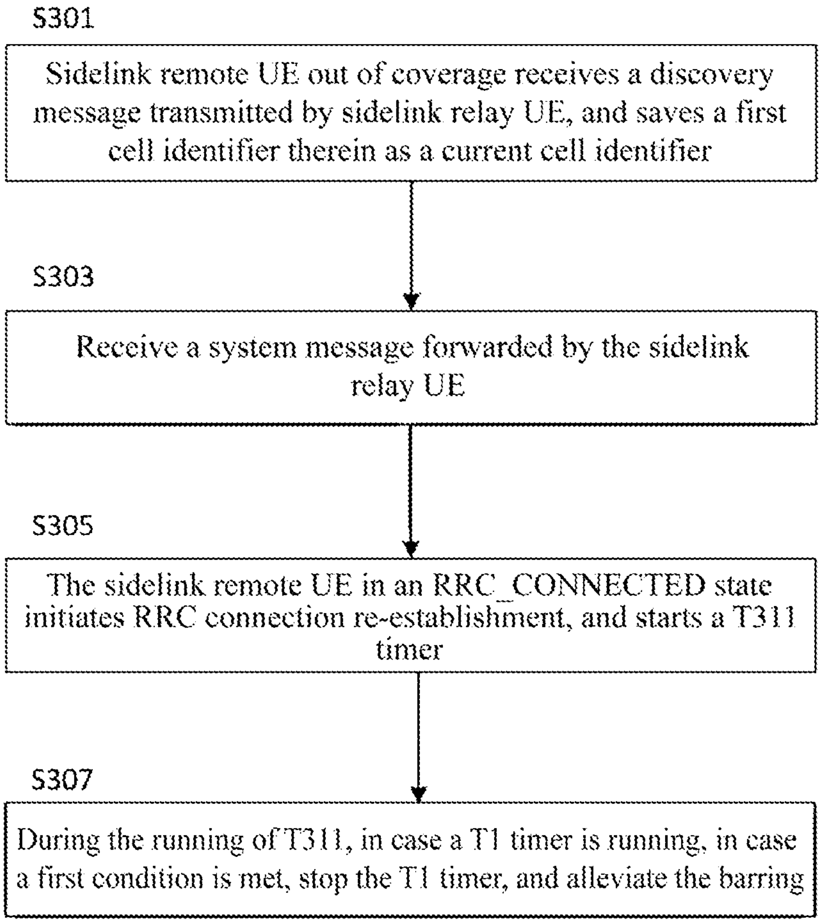
FIG. 3 is a flowchart of a method performed by sidelink remote user equipment according to Embodiment 3 of the present invention.

FIG. 3 is a flowchart of a method performed by sidelink remote user equipment according to Embodiment 3 of the present invention.

The present embodiment includes 301, 303, 305, and 307.

Optionally, step 301 is the same as step 101, and step 303 is the same as step 103.

Optionally, in step 305, the sidelink remote UE in an RRC_CONNECTED state initiates an RRC connection re-establishment procedure with a network, and starts T311.

Optionally, in step 307, during the running of T311 or in case T311 is running, in case T1 is in a running period or T1 is running, in case a first condition is met, the sidelink remote UE stops T1 and performs barring alleviation. The scenarios and forms of a first condition variant 1 and a first condition variant 2 are same as the scenarios and forms described in Embodiment 1.

Optionally, the sidelink remote UE stops T1 for all access categories. Optionally, in case the sidelink remote UE is in an out-of-coverage scenario, step 307 is performed; otherwise, step 307 is not performed.

Embodiment 4

Figure 4:
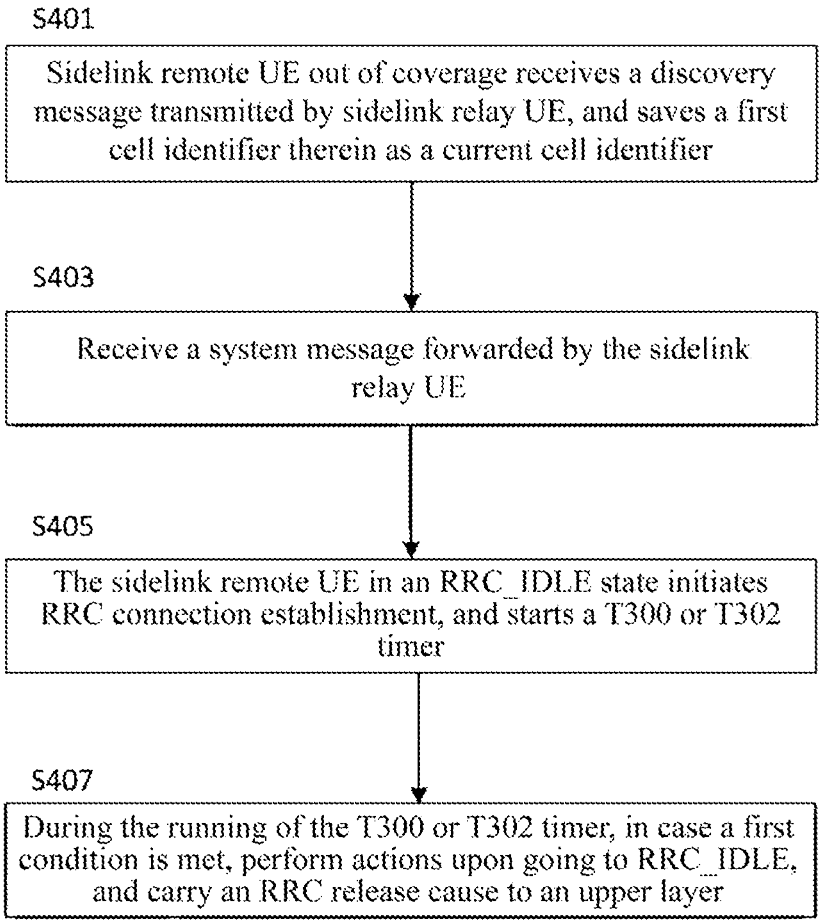
FIG. 4 is a flowchart of a method performed by sidelink remote user equipment according to Embodiment 4 of the present invention.

FIG. 4 is a flowchart of a method performed by sidelink remote user equipment according to Embodiment 4 of the present invention.

The present embodiment includes 401, 403, 405, and 407.

Optionally, step 401 is the same as step 101, and step 403 is the same as step 103.

Optionally, in step 405, the sidelink remote UE in an RRC_IDLE state initiates an RRC connection establishment procedure with a network, and starts a T300 or T302 timer.

Optionally, in step 407, during the running of T300/T302 or in case T300/T302 is running, when a first condition is met, the sidelink remote UE performs actions upon going to RRC_IDLE, and may carry a release cause value (e.g., RRC connection failure).

Optionally, in case the sidelink remote UE is in an out-of-coverage scenario, step 407 is performed; otherwise, step 407 is not performed.

Embodiment 5

Figure 5:
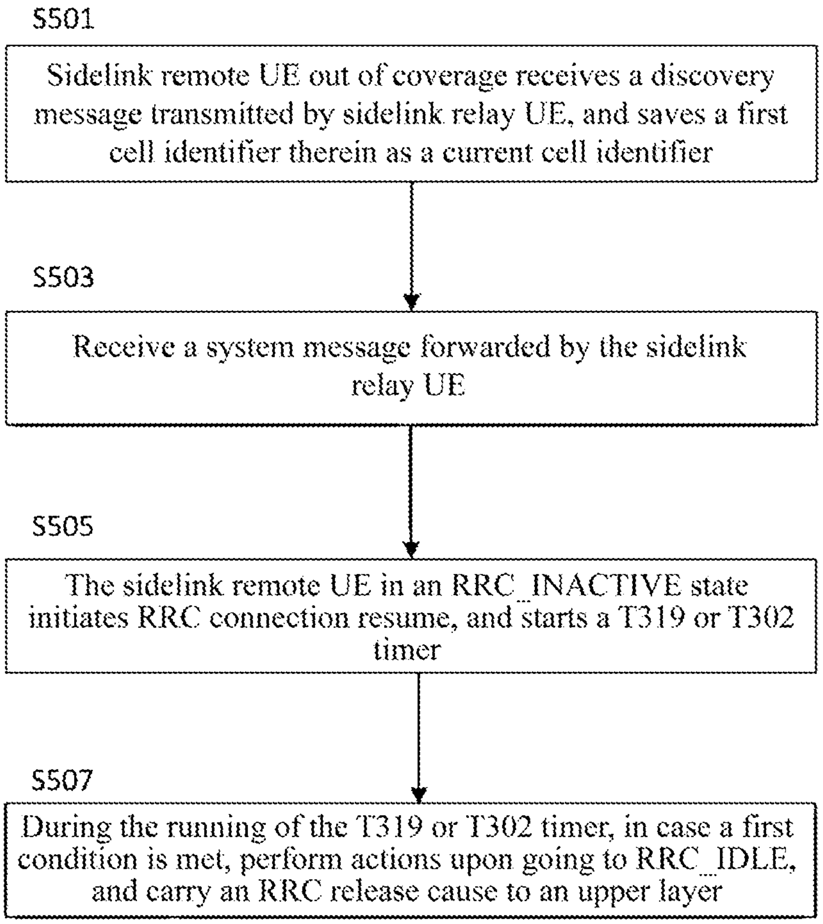
FIG. 5 is a flowchart of a method performed by sidelink remote user equipment according to Embodiment 5 of the present invention.

FIG. 5 is a flowchart of a method performed by sidelink remote user equipment according to Embodiment 5 of the present invention.

The present embodiment includes 501, 503, 505, and 507.

Optionally, step 501 is the same as step 101, and step 503 is the same as step 103.

Optionally, in step 505, the sidelink remote UE in an RRC_INACTIVE state initiates an RRC connection resume procedure with a network, and starts a T319 or T302 timer.

Optionally, in step 507, during the running of T319/T302 or in case T319/T302 is running, when a first condition is met, the sidelink remote UE performs actions upon going to RRC_IDLE, and may carry a release cause value (e.g., RRC connection failure).

Optionally, in case the sidelink remote UE is in an out-of-coverage scenario, step 507 is performed; otherwise, step 507 is not performed.

Embodiment 6

Figure 6:
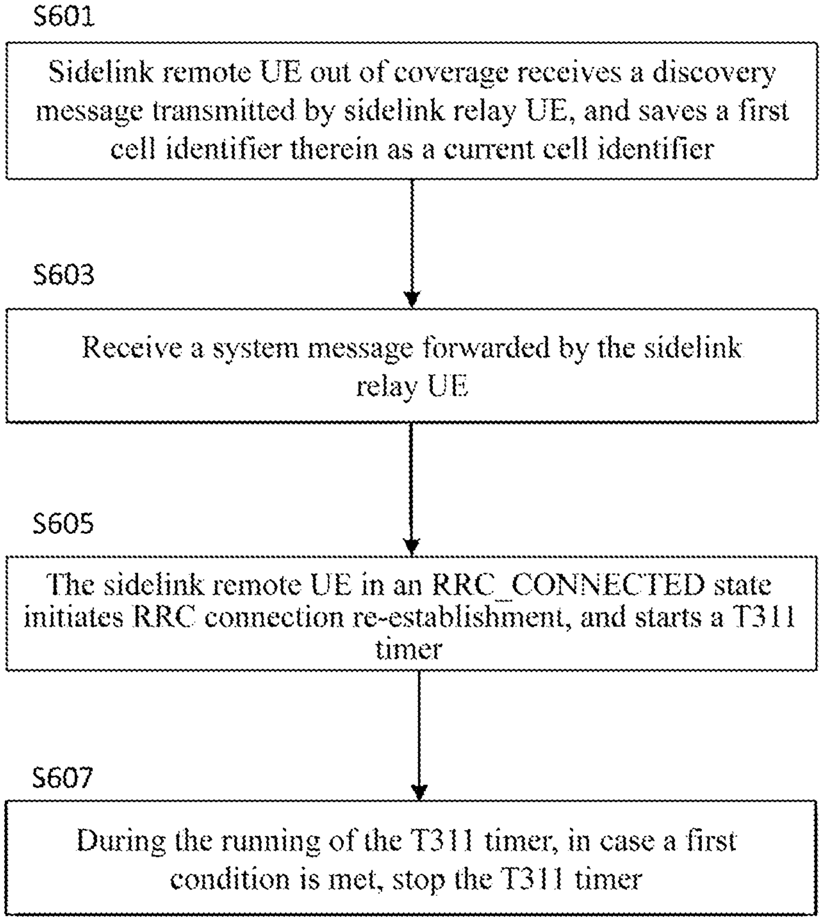
FIG. 6 is a flowchart of a method performed by sidelink remote user equipment according to Embodiment 6 of the present invention.

FIG. 6 is a flowchart of a method performed by sidelink remote user equipment according to Embodiment 6 of the present invention.

The present embodiment includes 601, 603, 605, and 607.

Optionally, step 601 is the same as step 101, and step 603 is the same as step 103.

Optionally, in step 605, the sidelink remote UE in an RRC_CONNECTED state initiates an RRC connection re-establishment procedure with a network, and starts a T311 timer.

Optionally, in step 607, during the running of T311 or in case T311 is running, when a first condition is met, the sidelink remote UE stops T311.

Optionally, in case the sidelink remote UE is in an out-of-coverage scenario, step 607 is performed; otherwise, step 607 is not performed.

Figure 7:
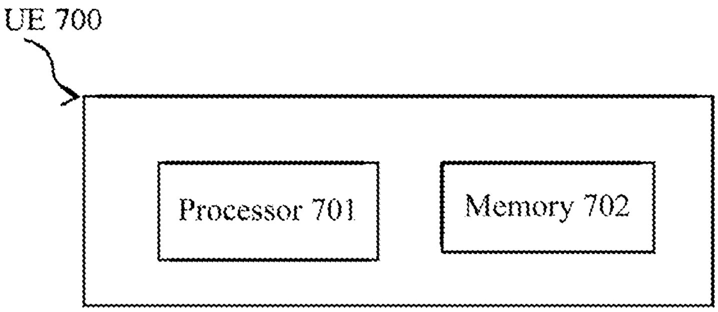
FIG. 7 is a simplified structural block diagram of user equipment (UE) relating to the present invention.

FIG. 7 is a simplified structural block diagram of user equipment (UE) relating to the present invention. As shown in FIG. 7, user equipment (UE) 700 includes a processor 701 and a memory 702. The processor 701 may include, for example, a microprocessor, a microcontroller, an embedded processor, and the like. The memory 702 may include, for example, a volatile memory (such as a random access memory (RAM)), a hard disk drive (HDD), a non-volatile memory (such as a flash memory), or other memories. The memory 702 stores program instructions. The instructions, when run by the processor 701, can implement the above method performed by user equipment as described in detail in the present invention.

The program running on the device according to the present invention may be a program that enables a computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing the programs by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application-specific integrated circuits (ASICs), field-programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A user equipment (UE), comprising a processor configured to:

start a timer T390 for an access category in a case that an access attempt associated with the access category is barred;

in a case that (i) relay selection occurs while a timer T311 and the timer T390 are running, and (ii) a suitable relay UE is selected, regardless of whether a cell of the selected relay UE is different from a current cell of the UE, stop timers T390 for all access categories, and perform barring alleviation; and in a case that (i) the UE is in a Radio Resource Control (RRC) idle (RRC_IDLE) state or an RRC inactive (RRC_INACTIVE) state, (ii) relay selection or reselection occurs, and (iii) a cell of a selected or reselected relay UE changes while the timer T390 is running, stop timers T390 for all the access categories, and perform the barring alleviation.

2. A method performed by a user equipment (UE), the method comprising:

starting a timer T390 for an access category based on an access attempt associated with the access category is barred;

based on (i) relay selection occurs while a timer T311 and the timer T390 are running, and (ii) a suitable relay UE is selected, regardless of whether a cell of the selected relay UE is different from a current cell of the UE, stopping timers T390 for all access categories, and performing barring alleviation; and based on (i) the UE is in a Radio Resource Control (RRC) idle (RRC_IDLE) state or an RRC inactive (RRC_INACTIVE) state, (ii) relay selection or reselection occurs, and a cell of a selected or reselected relay UE changes while the timer T390 is running, stopping timers T390 for all the access categories, and performing the barring alleviation.

* * * * *